United States Patent [19]  
Kikui et al.

[11] 3,953,977  
[45] May 4, 1976

[54] DEVICE FOR DAMPING WAVES
[75] Inventors: Keizo Kikui, Kamagaya; Michio Sasaki, Funabashi, both of Japan
[73] Assignee: Mitsui Shipbuilding and Eng. Co. Ltd., Tokyo, Japan
[22] Filed: July 11, 1974
[21] Appl. No.: 487,646

[30] Foreign Application Priority Data  
July 16, 1973  Japan.................................. 48-80170

[52] U.S. Cl. ..................................................... 61/5
[51] Int. Cl.² .......................................... E02B 3/06
[58] Field of Search .............................. 61/4, 5, 1, 3

[56] References Cited  
UNITED STATES PATENTS  
1,643,691  9/1927  Bignell................................... 61/5 X
3,222,871  12/1965  Miller et al. ............................. 61/5
3,276,210  10/1966  Stitt ......................................... 61/5
3,592,005  7/1971  Greenwood........................... 61/5 X
3,595,026  7/1971  Scholl ...................................... 61/5
3,691,774  9/1972  Hard ........................................ 61/5

Primary Examiner—Paul R. Gilliam  
Assistant Examiner—David H. Corbin  
Attorney, Agent, or Firm—Dorfman, Herrell and Skillman

[57] ABSTRACT

A device for damping waves comprising an inclined frame having a plurality of barriers and moored to the sea bottom so as to be downwardly sloped against the wave in the sea water, and an upright frame having a plurality of barriers provided on the upper end of said inclined frame and perpendicular to the plane of the inclined frame.

2 Claims, 2 Drawing Figures

U.S. Patent   May 4, 1976   3,953,977
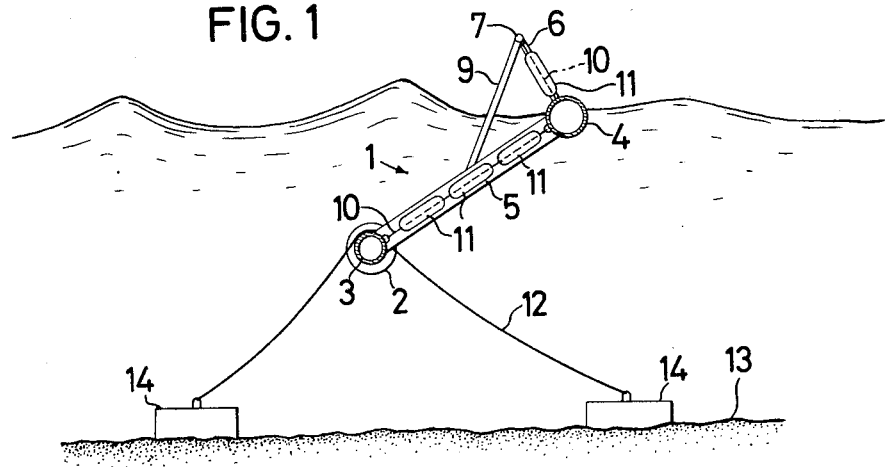
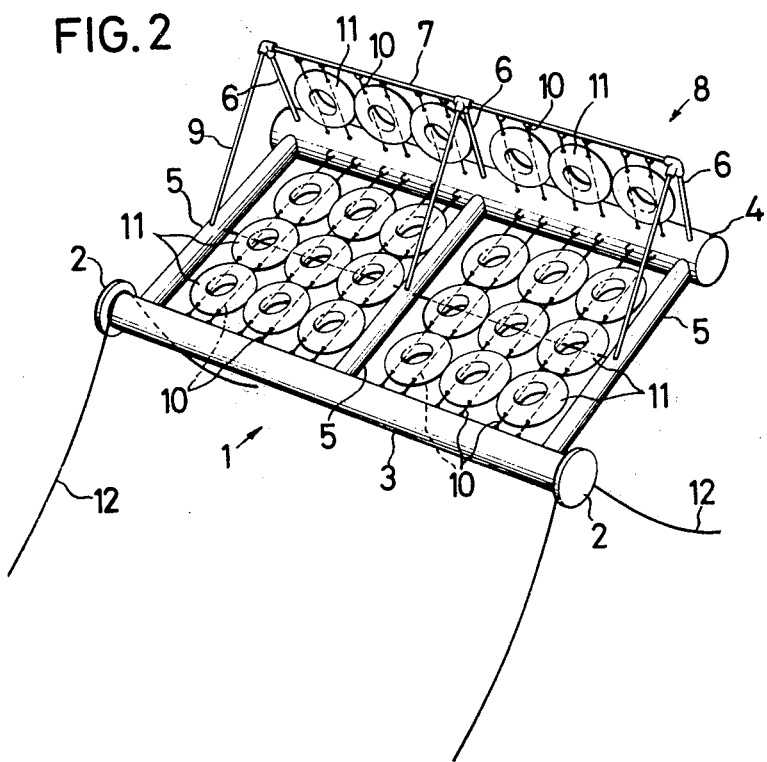

DEVICE FOR DAMPING WAVES

The present invention relates to a device for damping waves.

The object of the present invention is to provide a device for damping waves which has a higher wave damping effect than conventional device.

Another object of the present invention is to provide a device for damping waves which is useful for protecting a culturing installation and marine products.

Another object of the present invention is to provide a device for damping waves which may prevent the mixing and change of sea water in the culturing area and the accumulation of sand or erosion of sea bottom by wave.

Other objects and advantages of the present invention will be apparent from the following description taken in connection with the accompanying drawings, in which, FIG. 1 is a sectional side view of a device for damping waves according to the present invention; and FIG. 2 is a perspective view of the device for damping waves.

Referring to the drawings, numeral 1 is an inclined frame of steel which comprises a lower floating member 3 comprising a pipe each end of which is closed by a flange 2, an upper floating member 4 and spacer members comprising hollow pipes 5 connecting both floating members 3 and 4. On the upper floating member 4, an upright frame 8 perpendicular to the plane of the inclined frame 1 is provided. The upright frame 8 comprises posts 6, a girder 7 connecting the posts, and stays 9. In each space within the frames 1 and 8, a barrier is provided. The barrier is constructed by a plurality of annular members, such as used tires 11 which are held in the frame by penetrated steel wires 10. Between the tires and frame, gaps are formed to permit passing of sea water therethrough.

The device formed in the above manner is moored by wires 12 connected between the lower floating member 3 and the anchors 14 secured to the sea bottom 13 in such a manner that the device and hence the barriers are opposed against the wave. The mooring wires extend forwardly and rearwardly from the member 3 and maintain it submerged and the upper member 4 at the water surface. Buoyancy of the upper floating member 4 is adjusted so that the upper floating member may be positioned at the surface of the sea and that the frame may be inclined at a suitable angle to the horizontal plane. A plurality of the devices are arranged around the installation to be protected.

Thus the energy of wave is absorbed by barriers in the inclined frame 1 so that the wave is damped. The damped small wave is further broken by barriers in the upright frame 8.

From the foregoing it will be understood that the present invention has following advantages:

A. Since the inclined frame having barriers is positioned in the area where vertical distribution of the wave energy is most great, the energy is effectively absorbed by the barriers.

B. Since the inclined frame is downwardly sloped against the wave as beach, the wave passing over the frame is decreased and further broken by the upright frame.

C. Since, in the inclined frame, flexible barriers are provided, the wave is effectively damped with obstructing the flow of water.

D. Since the device is not affected by the tide, damping effect is not varied.

What is claimed is:

1. Device for damping seawater waves comprising an inclined frame constructed with upper and lower elongated floating members and a plurality of spacer members mounting said floating members in spaced parallel relation in an inclined plane with the floating members disposed generally parallel to the waves at the surface of the seawater, an upright frame mounted on and projecting upwardly from the upper floating member and having a plane perpendicular to the plane of said inclined frame, said upright frame including a top member spaced from said upper floating member and side members connecting said top member with said upper floating member, a plurality of inclined and upright barrier elements comprising annular elements secured to and mounted between said members respectively in the planes of said inclined frame and said upright frame, said barrier elements being mounted in their respective planes with gaps therebetween to permit passing of seawater through said frames, and mooring means for connecting the inclined frame to the sea bottom extending forwardly and rearwardly from said lower member and being of a length to maintain said lower floating member submerged at a depth below the surface to permit said upper floating member to float at the surface so that the inclined frame is downwardly sloped against the waves in the seawater and the upright frame is positioned at the surface of the seawater to project upwardly from said upper member.

2. A device according to claim 1 wherein said inclined frame spacer members extend perpendicularly between said upper and lower floating members, said device including stays projecting angularly upward from said spacer members to said upright frame to brace the latter.

* * * * *